(12) United States Patent         (10) Patent No.:     US 7,570,438 B2
McKinley                          (45) Date of Patent:     Aug. 4, 2009

(54) OPTICAL APPARATUS WITH OFF-AXIS DIRECTION-OF-VIEW

(76) Inventor: Arthur C. McKinley, 5 Willow Way, Westport, MA (US) 02790

( * ) Notice: Subject to any disclaimer, the term of this patent is extended or adjusted under 35 U.S.C. 154(b) by 238 days.

(21) Appl. No.: 11/257,509

(22) Filed: Oct. 25, 2005

(65) Prior Publication Data
US 2007/0091446 A1     Apr. 26, 2007

(51) Int. Cl.
G02B 17/00     (2006.01)
(52) U.S. Cl. .................................. 359/726; 359/736
(58) Field of Classification Search ......... 359/726–736
See application file for complete search history.

(56) References Cited

U.S. PATENT DOCUMENTS

| | | | |
|---|---|---|---|
| 4,113,354 A | 9/1978 | Yamasita et al. | |
| 4,138,192 A * | 2/1979 | Yamasita | 359/726 |
| 4,140,364 A | 2/1979 | Yamasita et al. | |
| 4,515,444 A | 5/1985 | Prescott et al. | |
| 4,641,927 A | 2/1987 | Prescott et al. | |
| 4,730,909 A * | 3/1988 | Takahashi | 359/735 |
| 4,757,805 A | 7/1988 | Yabe | |
| 4,964,710 A | 10/1990 | Leiner | |
| 4,969,708 A | 11/1990 | Leiner | |
| 5,412,504 A | 5/1995 | Leiner et al. | |
| 5,554,100 A | 9/1996 | Leiner et al. | |
| 5,651,759 A | 7/1997 | Leiner et al. | |
| 5,684,629 A | 11/1997 | Leiner | |
| 5,711,755 A | 1/1998 | Bonnell et al. | |
| 5,718,664 A | 2/1998 | Peck et al. | |
| 5,833,596 A | 11/1998 | Bonnell et al. | |
| 5,944,653 A | 8/1999 | Bonnell et al. | |
| 5,997,472 A | 12/1999 | Bonnell et al. | |
| 6,094,315 A * | 7/2000 | Aoki | 359/731 |
| 6,152,872 A | 11/2000 | Peck et al. | |
| 6,456,769 B1 | 9/2002 | Furusawa et al. | |
| 6,558,316 B2 | 5/2003 | Kikuchi et al. | |
| 6,626,828 B2 | 9/2003 | Dohi et al. | |
| 6,648,817 B2 | 11/2003 | Schara et al. | |
| 6,659,942 B2 * | 12/2003 | Lederer | 600/171 |
| 6,671,099 B2 | 12/2003 | Nagata | |
| 6,790,175 B1 | 9/2004 | Furusawa et al. | |
| 2002/0067411 A1 | 6/2002 | Thompson et al. | |
| 2004/0090683 A1* | 5/2004 | Nagata | 359/736 |
| 2004/0218083 A1 | 11/2004 | Thompson et al. | |
| 2005/0046952 A1* | 3/2005 | Nagata et al. | 359/627 |
| 2005/0049457 A1 | 3/2005 | Leiner et al. | |

* cited by examiner

*Primary Examiner*—Scott J Sugarman
(74) *Attorney, Agent, or Firm*—Luis Figarella

(57) ABSTRACT

An optical apparatus having an off-axis direction of view is disclosed. The optical apparatus advantageously has an outer dimension of less than about 2 mm. The optical apparatus can be utilized as a subsystem of an endoscopic device.

18 Claims, 3 Drawing Sheets

OPTICAL APPARATUS WITH OFF-AXIS DIRECTION-OF-VIEW

BACKGROUND OF INVENTION

1. Field of Invention

This invention relates to optical devices and, in particular, to optical viewing apparatus having an off-axis direction-of-view suitable for medical examination applications.

2. Discussion of Related Art

Optical systems as components of endoscopic apparatus have been disclosed. For example, Yamasita et al., in U.S. Pat. No. 4,113,354, disclose a single-lens reflex optical system for an endoscope. The disclosed system includes a first prism having a reflecting mirror with a small hole located at a position near the aperture stop of the photographing optical system, a second prism cemented to the first prism, and an observing optical system arranged near the exit surface of the second prism.

Yamasita et al., in U.S. Pat. No. 4,140,364, further disclose a variable field optical system for endoscopes. The optical system has an image guide, an objective, a fixed prism and a rotatable prism, which enables observation over a wide range of varying field.

Yabe, in U.S. Pat. No. 4,757,805, discloses an endoscope. The endoscope has an insertion section as a distal structure in which is disposed an objective optical system to be substantially parallel to the longitudinal axis thereof. A solid-state image sensing device, which has a light receiving surface with an image area is disposed in the distal structure so as to be substantially parallel to a plane which contains the longitudinal axis of the distal structure. An optical element is attached to an end portion of the objective optical system whereby the optical path of light incident on the objective optical system is bent substantially at right angles so that light is guided to the light receiving surface of the image sensing device.

Kikuchi et al., in U.S. Pat. No. 6,558,316, disclose an endoscope optical system including a composition having durability to a sterilization treatment.

Schara et al., in U.S. Pat. No. 6,648,817, disclose an apparatus and method for stereo viewing in variable direction-of-view endoscopy. The variable direction-of-view endoscope has a spherical window symmetric about a symmetry plane sealed to a distal end portion.

Furusawa et al., in U.S. Pat. No. 6,456,769, disclose a fiber bundle and endoscope apparatus. The fiber bundle consists of first optical fibers and second optical fibers. At a distal end of the fiber bundle, the first and second optical fibers are bundled in a square close-packed array or a hexagonal closed-packed array.

Dohi et al., in U.S. Pat. No. 6,626,828, disclose a body cavity-observing apparatus. The body cavity-observing apparatus includes an endoscope with an imaging optical system on the front edge thereof, a prism movably mounted on the forefront of the imaging optical system, and an actuator to drive the prism on a given command signal.

Furusawa et al., in U.S. Pat. No. 6,790,175, further disclose an endoscope system. The endoscope system is provided with a light guide including a plurality of optical paths, and a low-coherent light source that emits a low-coherent light beam. The low-coherent light source is provided with a proximal end side of the light guide. The light beams emitted by the low-coherent light source are incident on the plurality of optical paths. The endoscope system is further provided with an interferometer unit, a driving unit that moves the interferometer unit toward/away from an object, and a signal processing system that generates a tomogram based on signals detected by the light detecting devices.

SUMMARY OF THE INVENTION

The invention is directed to optical devices, optical systems, and components thereof as well techniques directed to fabricating, assembling, and utilizing such devices, systems, and components.

In accordance with one or more embodiments, the invention relates to optical systems. One or more optical systems of the invention can comprise an optical conduit, a first lens in optical communication with the optical conduit, a window adjacent to the first lens and having a transmissive surface and a first reflective surface, and an aperture stop disposed between the window and the first lens. The first lens is typically disposed in a cylindrical member having a diameter of about 2 mm.

In accordance with one or more embodiments, the invention relates to an optical system having an off-axis direction of transmission of about 30-degrees. The optical system can comprise a lens having a first reflective surface, a first prism adjacent to the lens and having a second reflective surface and an aperture stop disposed at an interface between the first prism and the lens.

In accordance with one or more embodiments, the invention relates to a method of viewing an object. The method can comprise acts of transmitting light from the object through a window having a viewing surface, reflecting the light from the object on a first reflective surface of the window, directing the reflected light through an aperture stop to a second reflective surface, focusing the light from the second reflective surface, and transmitting the focused light along an optical fiber.

In accordance with one or more embodiments, the invention relates to a method of viewing an object comprising an act of collecting light from the object through an optical assembly comprising an optical fiber, a lens in optical communication with the optical fiber, a prism in optical communication with the lens having a viewing surface and a reflective surface, and an aperture stop disposed between the prism and the lens.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DEFINITIONS

Figure 1:
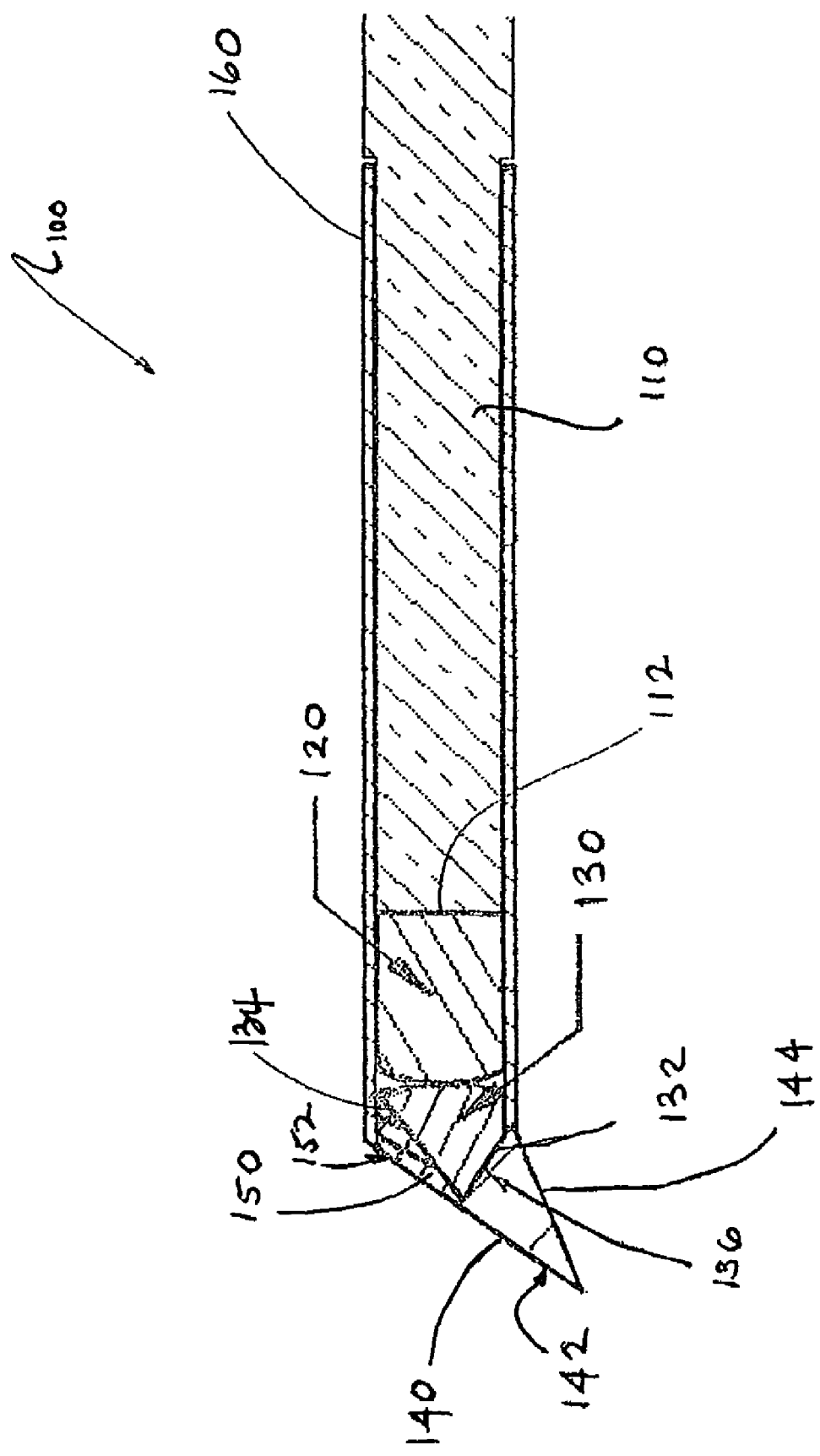
FIG. 1 illustrates an optical system in accordance with one or more embodiments of the invention.

As used herein, the term "plurality" refers to two or more items or components. The terms "comprising," "including,"

"carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims.

As used herein, a "transmissive surface" allows radiation, including visible light, to pass therethrough, typically with no or negligible attenuation, change or distortion. In contrast, a "reflective surface" redirects radiation to a corresponding direction, with or without attenuation, change, or modification wavelength.

DETAILED DESCRIPTION

This invention is not limited in its application to the details of construction and the arrangement of components set forth in the following description or illustrated in the drawings. The invention is capable of embodiments and of being practiced or of being carried out in various ways beyond those exemplarily presented herein.

The invention relates to optical systems. Such optical systems or devices can be utilized as components or subsystems of devices or systems utilized to observe and/or otherwise examine an object. For example, one or more optical systems in accordance with the invention can be utilized as components or subsystems of endoscopic devices.

One or more embodiments of the invention are directed to optical systems having a 90-degree field-of-view. One or more embodiments of the invention can also be directed to optical systems having an off-axis direction-of-view. Some aspects of the invention relate to one or more embodiments of optical systems having an off-axis direction-of-view, relative to a longitudinal axis of the optical system, of at least about 5-degrees, at least about 10-degrees, or even at least about 30-degrees. For example, an optical system of the invention can comprise an assembly having a length that provides a longitudinal dimension or long dimension. The off-axis direction-of-view of such an optical device can be relative to the long dimension or a predominant dimension axis.

Other aspects pertinent to some embodiments of the invention are directed to optical systems having an outer diameter of less than about 2 mm. One or more such embodiments can utilize optical components that have a largest dimension of less than about 0.6 mm.

The optical apparatus 100 exemplarily illustrated in FIG. 1 can comprise an optical conduit 110 in optical communication with a first lens 120. Optical apparatus 100 can further comprise a second lens 130, disposed adjacent to first lens 120, and having a transmissive surface 132 and, optionally, a first reflective surface 134. As shown in the configurations depicted in FIG. 1, second lens 130 can also be in optical communication with optical conduit 110, typically with at least one such optical conduit, through, for example, first lens 120.

Figure 5:
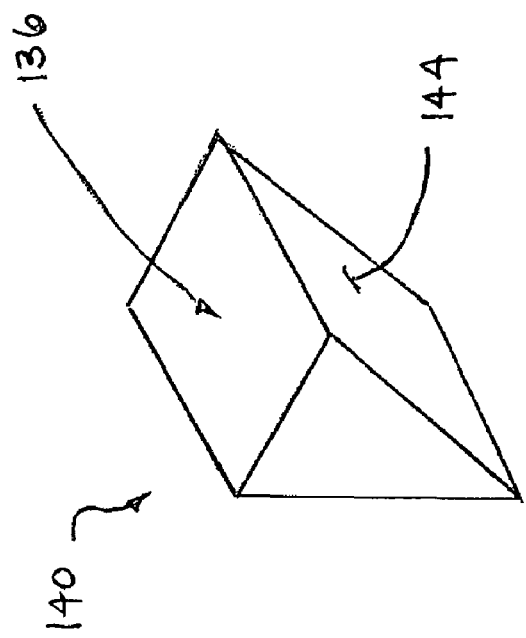
FIG. 5 illustrates an optical component of the exemplary systems illustrated in FIGS. 1 and 2.

Further embodiments of optical apparatus 100 comprise an aperture stop 136 disposed between window 130 and first lens 120. Some embodiments of optical apparatus 100 can also comprise a first prism 140 in optical communication with lenses 130 and 120 as well as optical conduit 110. Prism 140, as illustrated in FIGS. 1 and 5, can have at least one transmissive surface 142 and at least one reflective surface 144. In the embodiment shown in FIG. 5, aperture stop 136 is optionally disposed on a surface of prism 140, rather than, for example, on a surface of lens 130.

Figure 4:
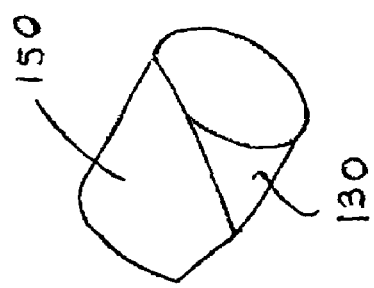
FIG. 4 illustrates an optical component of the exemplary systems illustrated in FIGS. 1 and 2.
Figure 3:
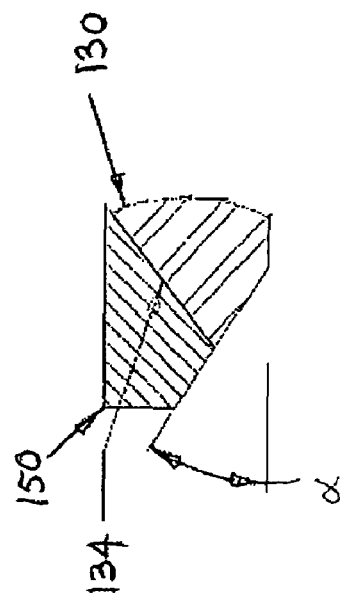
FIG. 3 illustrates an optical component of the exemplary systems illustrated in FIGS. 1 and 2.

Optionally, optical apparatus 100 can further comprise a second prism 150, which can be disposed adjacent first prism 140 and/or second lens 130. As exemplarily illustrated in FIGS. 1, 3, and 4, second prism 150 can be disposed against second lens 130, in a position opposite and/or against reflective surface 134. Prism 150 and/or reflective surface 134 can, in accordance with some embodiments of the invention, inhibit entry, at least partially, of any light into window 130 and/or first lens 120. Thus, in accordance with some embodiments of the invention, prism 150 can further comprise an optically opaque surface 152 on an outer surface thereof.

In accordance with still further embodiments of the invention, one or more components or subsystems of optical apparatus 100 are typically disposed in a member 160, such as a cylindrical housing, having a desired or limiting dimension. The desired dimension can be an outer diameter of member 160, such as an outer diameter of about 2 mm. Optical apparatus 100 can further have other characteristic properties, such as a longitudinal axis. In some embodiments of the invention, the characteristic property can be represented by a long or predominant dimension of optical apparatus 100. The longitudinal axis can thus be characterized by a predominant dimension of apparatus 100. Member 160 is typically constructed to be optically opaque to prevent any undesirable radiation from passing therethrough and affect light collected in the off-axis direction.

In accordance with one or more embodiments of the invention, light from one or more objects (not shown) to be observed or examined can be directed to and collected by the optical apparatus of the invention. For example, light from the object can be collected and enter first prism 140 through the one or more transmissive surfaces 142. Light within first prism 140 can be redirected to through transmissive surface 132 and/or aperture stop 136 by reflective surface 144. The redirected light can then be further redirected or reflected at first reflective surface 134. Thus, in some cases, an optical path can be defined through the viewing surface, a first reflective surface, an aperture stop, and a second reflective surface to an optical conduit.

In some embodiments of the invention, the light can then be projected as an image on a surface 112 and transmissible through optical conduit 110. Notably, other embodiments of the optical apparatus utilize electronic devices or systems instead of optical conduit. The electronic devices, such as a solid-state image-sensing device can convert the light received into electronic signals, which can be transmitted to electronic processing systems. Transmission of such signals to imaging or display systems can be effected by conventional techniques. The electronic processing systems can thus provide a representative image of the object on a monitor or otherwise display the image for examination.

In accordance with some embodiments of the invention, window 130 and lens 120 can be constructed and arranged to optically resolve an image of the object to be viewed from the off-axis direction of view. Indeed, window 130 and/or lens 120 can be comprised of optically transparent, medium or high index of refraction materials, e.g., 1.8 or greater, that facilitate focusing an image of an object viewed from the off-axis direction-of-view. Thus, in some embodiments of the invention, window 130 and lens 120 can have corresponding convex surfaces that focus an image as the collected light reflected from surface 134 on the image-sensing device and/or the optical conduit. For example, as illustrated in the figures, lens 120 and window 130 can be plano-convex and constitute a focusing lens assembly.

In accordance with one or more embodiments, the invention pertains to a method of fabricating an optical assembly.

The method can comprise one or more acts of disposing a first lens adjacent to a second lens. The method can further comprise providing a viewing prism having a transmissive surface and a second reflective surface adjacent the first lens and disposing an aperture stop between the viewing prism and the first lens. The method can further comprise one or more acts of disposing an optical fiber in a housing having a longitudinal axis and an outer dimension of about 2 mm in optical communication with the first lens. In accordance with still further embodiments of the invention, the method can further comprise an act of securing a viewing prism, such as prism 150, to a surface of the first lens to provide an off-axis direction of view relative to the longitudinal axis. As noted above, the first lens, such as window 130, can have reflective surface 134. The method of the invention can further comprise providing an aperture stop between window 130 and prism 140.

Securing prism 140 to window 130 can be effected utilizing any suitable technique that assures prism 140 is attached to window 130 together during typical use of optical system 100. For example, optical epoxy materials may be utilized to bond together the optical components. Likewise, prism 150 may be bonded to window 130, such as on reflective surface 134 thereof, with, for example, an optical adhesive. However, other embodiments directed to securing the optical components are contemplated. For example, a housing or bracket can be utilized to encapsulate, secure, or otherwise fasten at least a portion of any of the optical components together in a desired relative engagement. In some cases, a combination of techniques involving mechanical and chemical bonding may be performed to facilitate assembly and fabrication of the optical apparatus. For example, optical conduit 110 can be mechanically secured in member 160 whereas window 130 and prisms 140 and 150 can be bonded.

Any suitable material may be utilized to prepare the optical components. As noted above, the window or prism may be constructed from optically transparent material, having a desired index of refraction. For example, the window and/or prisms may comprise glass having an index of refraction of about 1.7 or about 1.8. Examples of suitable glass include those commercially available from Ohara Inc., Kanegawa, Japan. Examples of suitable adhesive or bonding materials include those commercially available from Epoxy Technology, Inc., Billerica; Mass., or Norland Optical Adhesives, New Brunswick, N.J.

Image fiber bundle can be of any type, including, for example, leached or fused varieties. Manufacturers of suitable fibers include, but are not limited to, SCHOTT North America, Inc., Southbridge, Mass., and Sumitomo Electric Lightwave Corp., Research Triangle Park, N.C.

Aperture stop 136 can be made by utilizing any suitable technique. For example, a photolithography process on the appropriate surface of the prism can be performed to provide an aperture stop having a desired or predetermined dimension. The reflective surfaces can be prepared by coating the desired surface with a suitable reflective material, such as, silver, aluminum, or even a dielectric material in a vacuum chamber in accordance with any suitable technique that provides a reflective layer of desired dimensions.

It should be appreciated that numerous alterations, modifications, and improvements may be made to the illustrated system. Moreover, the invention contemplates the modification of existing devices to retrofit one or more systems, subsystems, or components and implement the techniques of the invention. Thus, for example, an existing endoscopic system can be modified to include one or more optical devices of the invention in accordance with one or more embodiments exemplarily discussed herein. For example, the optical apparatus can further comprise a coating on at least a portion thereof. The coating can be any desired coating, which can comprise one or more layers that renders the optical apparatus at least partially resistant and/or impervious to corrosion. For example, the optical apparatus of the invention can comprise one or more layers of chemically and/or biologically inert layers that protects the optical apparatus, and/or components thereof, during use as, inter alia, an endoscopic device. Such coatings need not necessarily be optically transparent but would preferably be especially where the entire optical apparatus were to be encapsulated. Suitable examples of coatings or layers thereof include those conventionally referred to as conformal coatings. Non-limiting examples of commercially available conformal coatings include those available from Dow Corning Corporation, Midland, Mich. as well as those from Cookson Specialty Coating Systems, Indianapolis, Ind.

EXAMPLES

The function and advantages of these and other embodiments of the invention can be further understood from the examples below, which illustrate the benefits and/or advantages of the one or more systems and techniques of the invention but do not exemplify the full scope of the invention.

Example 1

This example describes the fabrication and assembly of an optical apparatus in accordance with one or more embodiments of the invention.

Figure 2:
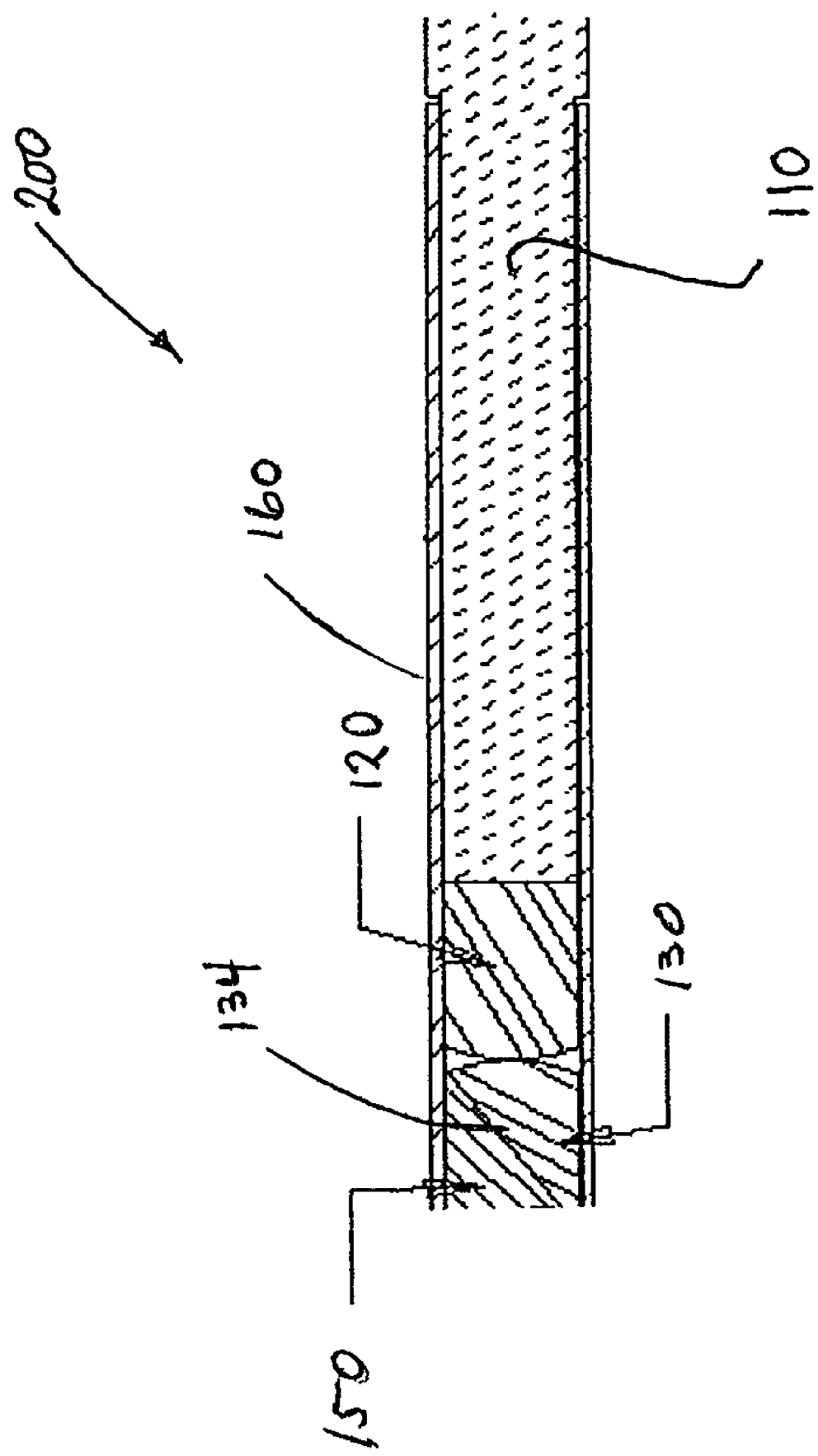
FIG. 2 illustrates an optical system at an intermediate assembly in accordance with one or more embodiments of the invention.

Schematically illustrated in FIG. 2 is an elevational cross-sectional view of an intermediate assembly utilized to fabricate an optical apparatus according to one or more embodiments of the invention.

The assembly 200 an optical conduit is comprised of a fiberoptic image bundle 210. Image bundle 110 typically includes a plurality of optical fibers. In this example, image bundle 110 is comprised of about 17,000 optical fibers from Sumitomo Electric Industries, Ltd. A lens tube 160 comprised of any suitable material capable of at least partially rigidly maintaining optical components of assembly 200 is shown. As such, lens tube 160 can be comprised of chemically and/or biologically inert materials including, but not limited to, polymers and metals such surgical-grade stainless steel.

An optical imaging subsystem comprised of lenses 120 and 130 was also disposed in lens tube 160. Lens tube 160 was comprised of stainless steel with a nominal inner diameter of about 0.6 mm and a nominal outer diameter of about 0.71 mm. Lenses 120 and 130 were comprised of optical grade glass; lens 120 was comprised of glass having an index of refraction of about 1.7 and lens 130 has an index of refraction of about 1.8. As shown, lens 120 had a first end having a convex surface, with a radius of about 0.75 mm, and a second end, distal from the first end adjacent to image bundle 110.

Assembly 200 was further comprised of a prism 150 adjacent lens 130. Assembly 200 further included a reflective surface 134 disposed between lens 130 and prism 150. Reflective surface was deposited by utilizing conventional thin film techniques. Reflective coatings can be of metallic or dielectric types.

The end of assembly 200 from image bundle 110 was polished at an angle, $\alpha$, of about 33.8° relative to a datum defined by lens tube 160. Angling and polishing was effected by conventional fiberoptic grinding and polishing techniques. Polish quality is suitable for image quality micro surfaces (no visible defects at about 40× magnification).

A second prism 140 was prepared to have the geometry illustrated in FIG. 5. This wedge-shaped optical component 140 had a first surface whereupon an aperture stop 136 was disposed having an opening diameter of about 0.12 mm. The dimension of aperture-centered surface was about 0.54 mm by about 0.66 mm. On a second surface, a reflective layer was deposited thereon to render this surface as reflective surface 144. The geometrical configuration of prism 140 provided an angle defined between the aperture-containing surface and the reflective surface of about 56.8°. Prism 140 was comprised of optical glass having an index of refraction of about 2.0. The reflective surfaces are coated with silver or aluminum in a vacuum chamber per normal practice for reflective surfaces With reference now to FIG. 1, second prism 140 was attached or otherwise secured to the angled, polished surface of lens 130 by utilizing an optical epoxy such as supplied by Epoxy Technology, Inc., Billerica, Mass., or Norland Optical Adhesives, New Brunswick, N.J. to result in the optical system illustrated in FIG. 1.

One or more of optical components 120, 130, 140, and 150 were comprised of optical glass from SCHOTT North America, Inc., Duryea, Pa., or Ohara, Inc., Kanegawa, Japan, coated with anti-reflective and reflective layers where indicated. Coatings are applied using conventional thin film techniques.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Further, acts, elements, and features discussed only in connection with one embodiment are not intended to be excluded from a similar role in other embodiments. It is to be appreciated that various alterations, modifications, and improvements can readily occur to those skilled in the art and that such alterations, modifications, and improvements are intended to be part of the disclosure and within the spirit and scope of the invention. Thus, for example, retrofitting existing devices utilizing optical subsystems is contemplated by the invention.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

What is claimed is:

1. An optical system for communication with an optical conduit comprising:
    a first lens to be placed in optical communication with the optical conduit;
    a second lens having only one reflective surface adjacent to said first lens;
    a first prism disposed for optical communication with said second lens, said first prism having only one reflective surface; and
    an aperture stop disposed between said second lens and said first prism.

2. The optical system of claim 1,
    wherein the first prism is constructed and arranged to provide an off-axis direction-of-view of up to and including 30-degrees relative to a longitudinal axis.

3. The optical system of claim 2,
    wherein an optical path is provided from the first prism's only reflective surface;
    through said aperture stop between said first prism and said second lens;
    reflected on the only reflective surface of said second lens; and
    through the first lens to the optical conduit.

4. The optical system of claim 3,
    wherein said first lens comprises a plano-convex lens.

5. The optical system of claim 3,
    wherein the optical conduit comprises a fiber bundle.

6. The optical system of claim 3, wherein the optical conduit comprises an electronic system.

7. An optical system having an off-axis direction of transmission of up to and including 30-degrees off its longitudinal axis comprising:
    a first lens;
    a second lens having only one reflective surface;
    a first prism adjacent to said second lens, said first prism having only one reflective surface, disposed in optical communication with said reflective surface of said second lens; and
    an aperture stop disposed at the interface between said first prism and said second lens.

8. A method of viewing an object comprising:
    transmitting light from the object through a first prism having a viewing surface;
    reflecting the light from the object on the only one reflective surface on said first prism;
    directing the reflected light through an aperture stop to the only reflective surface located within a second lens;
    focusing the light through said second lens;
    transmitting the light from the second lens into a first lens that is in optical communication with an optical fiber; and
    transmitting the focused light along an optical fiber.

9. The method of claim 8,
    wherein the act of viewing comprises viewing the object at up to and including 30-degrees off-axis relative to a longitudinal axis defined by the optical fiber and the first lens.

10. A method of viewing an object comprising;
collecting light from the object through an optical assembly comprising an optical fiber,
providing a first lens in optical communication with the optical fiber,
providing a second lens having only one reflective surface, said second lens being in optical communication with said first lens;
providing a first prism in optical communication with said second lens having a only one reflective surface, and
providing an aperture stop disposed between said first prism and said second lens.

11. The method of claim 10 wherein;
the act of viewing comprises viewing the object at up to and including 30-degrees off-axis relative to a longitudinal axis.

12. A method of fabricating an optical assembly comprising acts of:
disposing a first lens adjacent to a second lens having only one reflective surface;
providing a first prism having only one reflective surface adjacent said second lens; and
disposing an aperture stop between said first prism and said second lens.

13. The method of claim 12, further comprising;
an act of disposing an optical fiber in a housing in optical communication with said first lens.

14. The method of claim 13, further comprising;
an act of securing the first prism to a surface of the second lens to provide an off-axis direction-of-view relative to the longitudinal axis.

15. The method of claim 12, further comprising;
an act of providing a plano-convex lens in optical communication with the first reflective surface and the fiber.

16. The method of claim 12, wherein;
the act of providing the first lens comprises providing a focusing lens assembly.

17. The method of claim 12, further including;
an application of metallic or dielectric coatings to said only reflective surface of said second lens to inhibit light transmission through said second lens only reflective surface.

18. The method of claim 12, further comprising;
an act of providing a plano-convex lens in optical communication with an electronic system.

* * * * *